United States Patent [19]

Welti

[11] 3,917,998

[45] Nov. 4, 1975

[54] BUTLER MATRIX TRANSPONDER

[75] Inventor: George R. Welti, Leesburg, Va.

[73] Assignee: Communications Satellite Corporation, Washington, D.C.

[22] Filed: Nov. 2, 1973

[21] Appl. No.: 412,399

[52] U.S. Cl. .......................... 325/3; 325/4; 328/165

[51] Int. Cl. .............................................. H04b 1/59

[58] Field of Search ...................... 325/3, 4, 65, 476; 330/126; 328/165

[56] References Cited

UNITED STATES PATENTS

| | | | |
|---|---|---|---|
| 3,255,450 | 6/1966 | Butler | 343/853 |
| 3,277,373 | 10/1966 | Allen | 325/4 |
| 3,678,387 | 7/1972 | Wilson | 325/4 |

*Primary Examiner*—George H. Libman
*Attorney, Agent, or Firm*—Sughrue, Rothwell, Mion, Zinn & Macpeak

[57] ABSTRACT

A new design for a multiple channel repeater having advantages for satellite communications systems is described. The design comprises a pair of complementary N × N Butler matrix networks that precede and follow a set of N non-linear amplifying devices. A set of filters follows the output matrix network. The phase shifts produced by the input and output matrices cause a substantial fraction of the intermodulation products to flow to output ports that are tuned to frequencies different than the intermodulation product frequencies. These intermodulation products are therefore attenuated by the output port filters and do not appear as interference. With a portion of the intermodulation products removed from the output signals, the nonlinear amplifiers can operate closer to saturation for a given output carrier-to-intermodulation ratio than a conventional transponder thereby increasing overall DC-to-RF conversion efficiency.

10 Claims, 3 Drawing Figures

BUTLER MATRIX TRANSPONDER

BACKGROUND OF THE INVENTION

1. Field of the Invention

The present invention generally relates to communication systems transponders, and more particularly to a multichannel Butler matrix transponder having specific application to communications satellites.

2. Description of the Prior Art

Conventional satellite communications transponders consist of a number of separate power amplifiers carrying distinct signals. The operating point of each amplifier is normally set to produce an average output level substantially below the saturated output level of the amplifier. This practice assures linearity but results in rather low efficiency in the conversion from DC prime power to RF radiated power.

SUMMARY OF THE INVENTION

It is therefore an object of this invention to provide a new multichannel transponder configuration having the property of amplifying signals with less intermodulation product distortion than is possible with conventional multichannel amplifier configurations.

It is another object of the invention to provide a multichannel communications satellite transponder which is able to operate at higher output levels and DC-to-RF efficiencies for a given output carrier-to-intermodulation noise ratio.

The foregoing and other objects are attained by providing a transponder which amplifies M distinct carriers using N nonlinear amplifiers. The M inputs feed an input N × N port Butler matrix where M ≤ N. The N output ports of the matrix are connected to N separate nonlinear amplifiers. The amplifier outputs feed a second, complementary N × N port output Butler matrix. The phase shifts produced by the input and output matrices cause a substantial fraction of the intermodulation products to flow to output ports that are either unused (M<N) or tuned to frequencies different than the intermodulation product frequencies (M ≤ N). If there are unused output ports, these are simply terminated in a matching impedance. M bandpass filters may be connected to the selected used output ports of the output matrix, and intermodulation products at these ports are attenuated by output port filters. This allows the nonlinear amplifiers to operate closer to saturation for a given output carrier-to-intermodulation ratio than a conventional transponder thereby increasing DC to RF power conversion efficiency.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
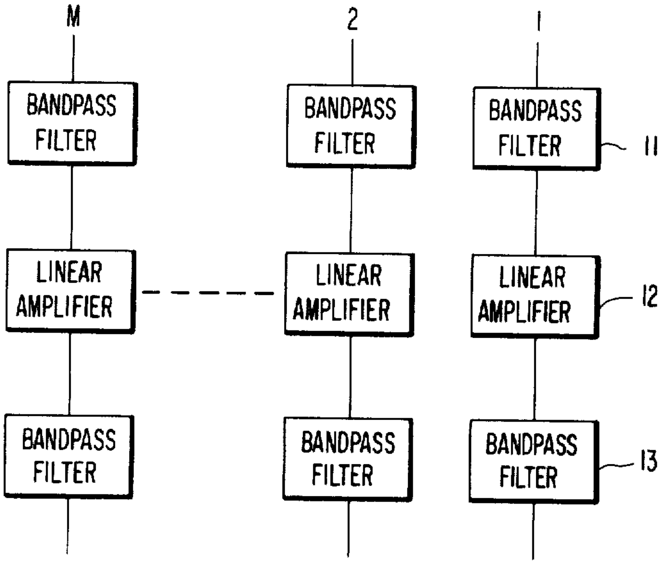
FIG. 1 PRIOR ART
FIG. 1 is a simplified schematic and block diagram illustrating a conventional M channel transponder.

Referring now to the drawings, and more particularly to FIG. 1 thereof, a conventional satellite multichannel communications transponder is generally illustrated as comprising M channels. Each channel is distinct and includes an input bandpass filter 11, a linear power amplifier 12, and an output bandpass filter 13. Typically in such a multichannel system, the channels occupy contiguous frequency bands and most channels are occupied by multiple carrier signals. The distinct multicarrier signals in each channel received by the transponder are amplified by the corresponding amplifier 12 for retransmission. The operating point of each amplifier is normally set to produce an average output level substantially below the saturated output level of the amplifier. This assures adequate linearity, but results in rather low efficiency in the conversion from DC prime power on board the satellite to RF radiated power.

Figures 2, 3:
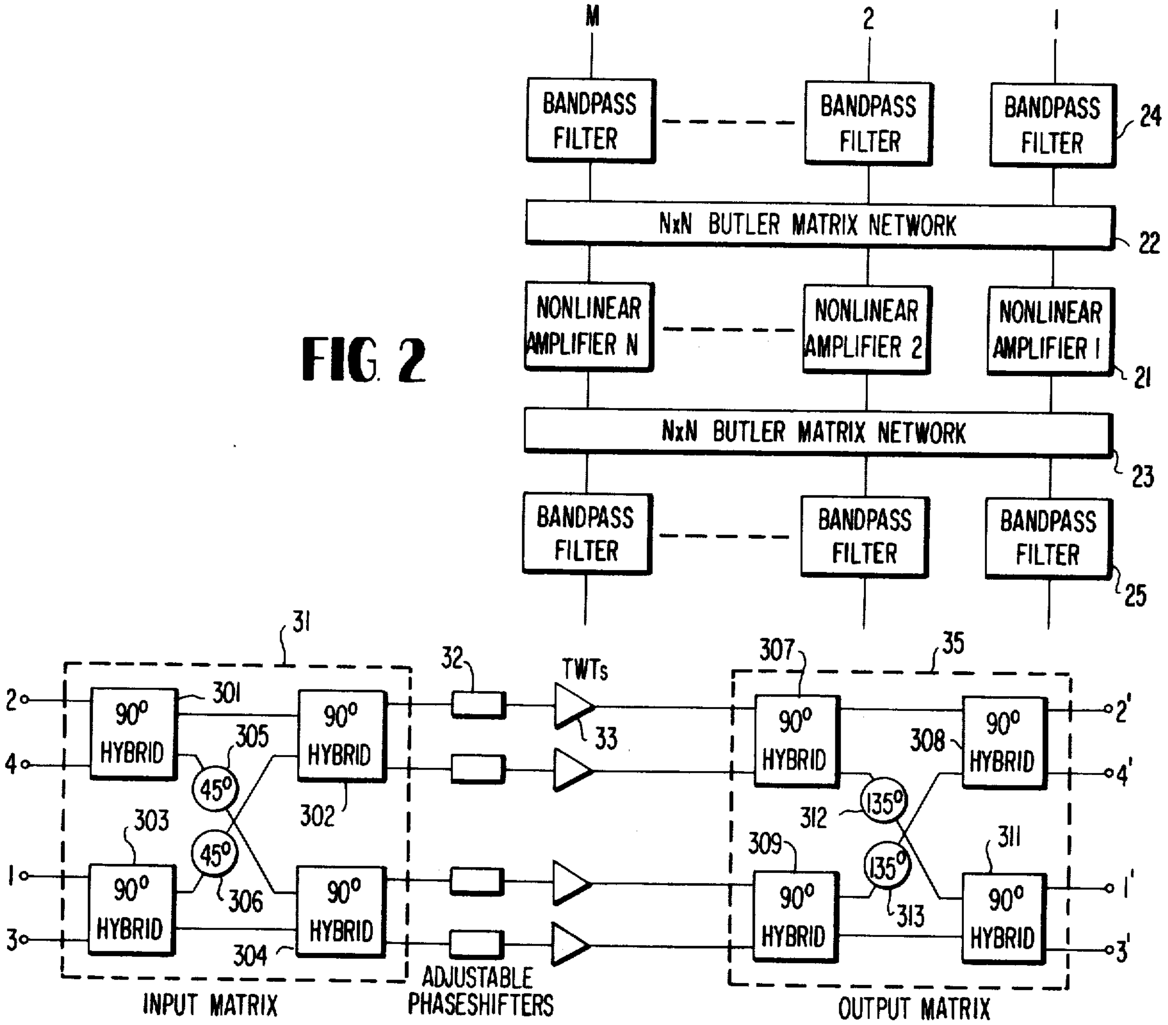
FIG. 2 is a simplified schematic and block diagram illustrating an M channel N × N Butler matrix transponder according to the invention.
FIG. 3 is a schematic diagram of a specific 4 × 4 Butler matrix transponder.

FIG. 2 shows the configuration of the Butler matrix transponder according to the invention wherein M distinct multicarrier signals are amplified by N nonlinear amplifiers 21 (M ≤ N). As illustrated, the N nonlinear amplifiers 21 are "sandwiched" between two N × N Butler matrices 22 and 23. These matrices, while identical, are connected via the amplifiers in mirror image fashion. The M input signals are separated by input bandpass filters 24 connected to the input ports of matrix 22. Alternatively, channel separation of the input signals may be provided by directional antennas or other appropriate means. The output ports of matrix 23 may be connected to output bandpass filters 25 which are tuned to the same bands as input filters 24.

The Butler matrix, which was developed as a multiple beam feed network for a phased antenna array, is a linear passive and ideally lossless network consisting of hybrid couplers and phase shifters. Reference may be had to U.S. Pat. No. 3,255,450 to Jesse L. Butler for "Multiple Beam Antenna System Employing Multiple Directional Couplers in the Leadin" which discloses the basic Butler matrix. Specifically, FIGS. 3 and 5 of that patent illustrate an 8 × 8 and a 4 × 4 Butler matrix, respectively, which may be used in the practice of the present invention.

Because the Butler matrix network is reciprocal, if two identical Butler matrices are connected "back-to-back" or in mirror image fashion, a signal applied at an input port of the first matrix will appear at the corresponding output port of the second matrix with (ideally) no attenuation, and no component of that signal will appear at any other output port, assuming that all ports are terminated with matching impedances. Thus, when N identical nonlinear amplifiers are inserted between two identical Butler matrices to form a Butler matrix transponder as illustrated in FIG. 2, signals applied to M of the input ports of the first matrix will appear amplified at the M corresponding output ports of the second matrix. Each amplifier's input voltage consists of the sum of all phase-shifted signals divided by $\sqrt{N}$. However, because of the different relative phase shifts that each signal has at the input to the amplifiers, each intermodulation product at the amplifiers' output will also have amplifier-to-amplifier phase shifts that cause the intermodulation product to be directed to a single output port. The particular output port to which an intermodulation product is directed depends on the input ports of the signal components which generate the intermodulation product and the order of the intermodulation product. It is this property of the Butler matrix transponder which permits intermodulation product interference to be reduced. If input signal frequency bands or channels are judiciously assigned to the Butler matrix input ports, a large number of the intermodulation products resulting from the use of nonlinear amplifiers can be routed to ports that are tuned to frequencies different from the intermodulation product frequencies and thus suppressed by the output port band pass filters.

The normalized input port/output port relations for the Butler matrix network are given by $$F_r = \frac{1}{\sqrt{N}} \sum_{l=0}^{N-1} f_l e^{-j\frac{2\pi lr}{N}} \qquad (1)$$

$$f_l = \frac{1}{\sqrt{N}} \sum_{r=0}^{N-1} F_r e^{j\frac{2\pi lr}{N}} \qquad (2)$$

where $f_l$ = the signal at the $l$-th input port $F_r$ = the signal at the $r$-th output port Equations (1) and (2) are recognized as a discrete Fourier transform pair.

As will be shown from equations (1) and (2) that if two identical ideal Butler matrix networks are connected back-to-back, so that the second network is a mirror image of the first network, a signal that is applied to an input matrix port will appear unattenuated at the comparable port in the output matrix with no component of that signal present at any other port, assuming that all ports are terminated with matching impedances. Thus, in the absence of amplifier nonlinearities, each signal (by superposition) in an ideal Butler matrix transponder is amplified independently of the signals applied to other input ports.

The transfer characteristic of a nonlinear amplifier can be expressed as $$e_{out} = g(e_{in})\, e^{jf(e_{in})} \qquad (3)$$

where $g(e_{in})$ represents the amplitude distortion characteristic and $f(e_{in})$ represents the amplifier's phase shift due to input amplitude variations, i.e. $f(e_{in})$ is the amplitude modulation to phase modulation (AM—PM) conversion characteristic. Several forms of $g(e_{in})$ and $f(e_{in})$ have been used to characterize nonlinear amplifiers. See, for example, A. L. Berman and C. E. Mahle, "Nonlinear Phase Shift in Traveling Wave Tubes as Applied to Multiple Access Communication Satellites," IEEE Transactions on Communications, Feb. 1970, pp. 37–48, and A. R. Kaye, D. A. George, and M. J. Eric, "Analysis and Compensation of Bandpass Nonlinearities for Communications," IEEE Transactions on Communications, Oct. 1972, pp. 965–972. Additionally, O. Shimbo, "Effects of Intermodulation AM–PM Conversion, and Additive Noise in Multicarrier TWT Systems," Proceedings of the IEEE, Feb. 1971, pp. 230–238, gives a unified treatment of amplitude distortion and AM–PM conversion with examples of power series and Fourier series expansions which include both effects.

When the input signals are multiple carriers, the calculation of the amplifier's output can be separated into two steps: the combinatorial problem of determining the frequency and relative phase (i.e. relative to the phases of the input signals) of each of the intermodulation products of the classes of interest, and the problem of finding the magnitude and absolute phase of each class of intermodulation products. In the following discussion only the former calculation is performed and thus the results presented are not dependent on the specific forms of $g(e_{in})$ and $f(e_{in})$.

If a multiple carrier input to a nonlinear amplifier is expressed as $$e_{in} = \sum_{q=1}^{Q} a_q \sin(\phi_q) \qquad (4)$$

where $\phi q = \omega_q t + \alpha_q$ then the output of the amplifier can be expressed as $$e_{out} = c \sum_{q=1}^{Q} a_q \sin(\phi_q) + Re \left[ \sum_{k_1=-\infty}^{\infty} \sum_{k_2=-\infty}^{\infty} \cdots \sum_{k_Q=-\infty}^{\infty} A(k_1, k_2, \ldots k_Q) \cdot e^{j(k_1\phi_1 + k_2\phi_2 \cdots k_Q\phi_Q)} \right] \qquad (5)$$

where $c$ is the amplifier's gain constant, $A(k_1 k_2, \ldots k_Q)$ is a complex quantity determined by $g(e_{in})$ and $f(e_{in})$, and the $k_q$ coefficients are any positive or negative integer or zero, subject to the following constraint:

$$\sum_{q=1}^{Q} k_q = 1$$

if only in-band products are to be considered.

The signal flow and intermodulation product flow in a Butler matrix transponder is now analyzed.

Let $f_l'$ = input to the $l$-th port of the first (input) Butler matrix $F_r'$ = output from the r-th port of the first Butler matrix $F_r$ = input to the r-th port of the second (output) Butler matrix $f_l$ = output from the $l$-th port of the second Butler matrix Also, let $$f_l' = Re \left[ \sum_{m=1}^{M_l} A_{m,l}\, e^{j\omega_{m,l} t} \right] \qquad (7)$$

where $M_l$ = the number of carriers at the $l$-th input port $A_{m,l}, \omega_{m,l}$ = the amplitude and the radian frequency, respectively, of the M-th carrier at the $l$-th input port From equation (1)

$$F_r' = Re \left[ \frac{1}{\sqrt{N}} \sum_{l=0}^{N-1} \sum_{m=1}^{M_l} A_{m,l}\, e^{j\left(\omega_{m,l} t - \frac{2\pi lr}{N}\right)} \right] \qquad (8)$$

$F_r'$ and $F_r$ as defined above, represent the input and output of the r-th amplifier in the Butler matrix transponder, respectively, if transmission line phaseshift constants are dropped. Note that equation (8), as does equation (4), represents a multicarrier amplifier input signal. In equation (8) adoption of exponential and double subscript notation has been made in order to be compatible with the notation of equations 1 and 2 and to permit a variable number of carriers ($M_l$) at each of the input ports. Using this notation, the output of the $r$-th amplifier $F_r$ is given by $$F_r = Re\left[\frac{c}{\sqrt{N}}\sum_{l=0}^{N-1}\sum_{m=0}^{M_l} A_{m,l}e^{j\left(\omega_{m,l}t - \frac{2\pi lr}{N}\right)}\right]$$

$$+ Re\left[\frac{1}{\sqrt{N}}\sum_{k_{1,0}=-\infty}^{\infty}\sum_{k_{1,1}=-\infty}^{\infty}\sum_{k_{1,2}=-\infty}^{\infty}\cdots\sum_{k_{1,N-1}=-\infty}^{\infty}\sum_{k_{2,0}=-\infty}^{\infty}\sum_{k_{2,1}=-\infty}^{\infty}\sum_{k_{2,2}=-\infty}^{\infty}\cdots\sum_{k_{2,N-1}=-\infty}^{\infty}\sum_{k_{m_{N-1},0}=-\infty}^{\infty}\sum_{k_{m_{N-1},1}=-\infty}^{\infty}\sum_{k_{m_{N-1},2}=-\infty}^{\infty}\cdots\sum_{k_{m_{N-1},m-1}=-\infty}^{\infty} A\left(k_{1,0},k_{1,1}\cdots k_{m_{N-1},N-1}\right) e^{j\left(k_{1,0}\phi_{1,0}+k_{1,1}\phi_{1,1}+\cdots k_{M_{N-1},N-1}\phi_{M_{N-1},N-1}\right)}\right] \quad (9)$$

where $$\phi_{m,l} + \omega_{m,l}\, t - (2\pi lr/N) \quad (10)$$

where the coefficients $k_{m,l}$ are any positive or negative integer or $$\sum_{l=0}^{N-1}\sum_{m=1}^{M_l} k_{m,l} = 1 \quad (11)$$

zero, subject to the constraint and where the subscripts $m,l$ refer to the $m$-th carrier of the $l$-th output port. (Note that both equations 9 and 5 represent the output of a nonlinear amplifier with a multiple carrier input, and that the only differences between the two are in the notation.) The phase term $2\pi lr/N$ in equations (8) and (9) represent relative phases. The absolute phaseshift through the system, assumed to be equal for all transmission paths and amplifiers, is not included in these expressions. Note that the amplifier-to-amplifier phase difference for a signal directed to the $l$-th output port is $(2\pi l/N$.

Substitution of the first part of equation (9), i.e., the signal components of the inputs to the second Butler matrix, into equation (2) i.e., the input/output equation for the second matrix, gives the Butler matrix transponder's signal component outputs. Consider an arbitrary output port, $p$, and let $f_p$ (signal) to be the signal component of the output at this port. Thus From equations (9) and (10), the i-th intermodulation product frequency, $\omega_i$, of the amplifier outputs, $F_r$, is given by $$\omega_i = \sum_{l=0}^{N-1}\sum_{m=1}^{M_l} k_{m,l}\omega_{m,l} \quad (13)$$

where the coefficients $k_{m,l}$ must satisfy the condition of equation (11). Similarly from equations (9) and (10) the amplifier-to-amplifier phase difference for the $i$-th intermodulation product, defined as $\alpha_i$, at the amplifier outputs, $F_r$, is given by $$\alpha_i = \frac{2\pi}{N}\sum_{l=0}^{N-1}\sum_{m=1}^{M_l} lk_{m,l} \quad (14)$$

Equations (13) and (14) show that when a specific intermodulation product (i.e. one set of $k_{m,l}$) has a frequency, $\omega_i$, equal to the frequency of a specific signal, for example the m-th carrier of the p-th port, $\omega_{m,p}$, the intermodulation product phase difference term, $\alpha_i$, will not in general be the same as the signal's amplifier-to-amplifier phase difference, $2\pi p/N$.

Thus if $$\sum_{l=0}^{N-1}\sum_{m=1}^{M_l} lk_{m,l} \neq p \qquad \text{Modulo } N \quad (15)$$

$$0 < p \leq N-1,$$

this intermodulation product will appear at an output port (as can be seen by substitution into equation (2)) different from the port, $p$, at which the signal at $\omega_{m,p}$ appears. It is this property of a Butler matrix transponder, i.e. the routing of large portions of the intermodulation products to output ports that are tuned to frequencies different from the intermodulation product frequencies which permits intermodulation interference to be reduced.

In designing a Butler matrix transponder to be used in a frequency division multiplex system with M contiguous frequency bands or channels, judicious selection of port-frequency assignments is necessary for maximum intermodulation product power rejection. In the preferred embodiment of the invention, the problem is to assign the M contiguous frequency bands to the ports of an N × N (M ≤ N) Butler matrix transponder so $$f_p(\text{signal}) = Re\left[\frac{1}{\sqrt{N}}\sum_{r=0}^{N-1}\left[\frac{c}{\sqrt{N}}\sum_{l=0}^{N-1}\sum_{m=1}^{M_l} A_{m,l}e^{j\left(\omega_{m,l}t - \frac{2\pi l\gamma}{N}\right)}\right]e^{j\frac{2\pi pr}{N}}\right]$$

$$= Re\left[\frac{c}{N}\sum_{r=0}^{N-1}\sum_{l=0}^{N-1}\sum_{m=1}^{M_l} A_{m,l}e^{j(\omega_{m,l}t)}\, e^{j\frac{2\pi r}{N}(p-l)}\right]$$

$$= Re\left[c\sum_{m=1}^{M_l} A_{m,l}e^{j(\omega_{m,l}t)}\right]\delta(p-l) \quad (12)$$

where $\delta(p-l)$ is defined as the Kronecker delta.

From equation (12), the signal component at the $p$-th output port of a Butler matrix transponder is an amplified replica of the signal at the $p$-th input port, with no components of signals at other input ports.

that every third order intermodulation product formed by the amplifiers is directed to an output port tuned to a frequency band different from the intermodulation product frequency.

Exhaustive examination has shown that there are 8 valid port-frequency assignments out of the 24 possible permutations for a 4 × 4 Butler matrix transponder assuming four contiguous frequency bands (M=4). Similarly, with M=6 and N=6, there are 12 valid port-frequency assignments out of 720 possible permutations. Exhaustive computation has also shown that if M=8 and N=8, there are no valid port-frequency permutations. In this case, either non-contiguous frequency bands must be used, or Mu must be equal to or less than 7. It is conjectured, but not proven, that for N ≥ 8, M must be less than N if contiguous frequency bands are to be used.

A procedure for the direct calculation of an ideal frequency-port assignment plan is not known. However, an algorithm can be used in a trial and error search procedure. This algorithm permits very rapid evaluation of candidate plans by a general purpose digital computer and thus makes the trial and error method a viable synthesis procedure.

A port difference matrix is used to test the validity of port-frequency assignment plan for an N×N Butler matrix transponder with M contiguous (in frequency) channels, M ≤ N. (Note: For N>8, M must be less than N.) There are two basic steps to the algorithm. These are 1) to fill the port difference matrix, and 2) to apply a series of tests to the port difference matrix.

Step 1:

The port difference matrix is defined as a matrix that identifies the number of ports that each frequency is separated from every other frequency. Since the matrix is skew symmetric, only the upper right-hand half is used.

An example of a portion of a port difference matrix is given below for N = 16.

| Frequency | 1 | 2 | 3 | 4 | 5 | 6 | 7 | 8 | 9 | 10———M | |
|---|---|---|---|---|---|---|---|---|---|---|---|
| 1 | 0 | 2 | 3 | 8 | 11 | 15 | 6 | 12 | 4 | 13 | |
| 2 | | 0 | 1 | 6 | 9 | 13 | 4 | 10 | 2 | 11 | M<16 |
| 3 | | | 0 | 5 | 8 | 12 | 3 | 9 | 1 | 10 | |
| 4 | | | | 0 | 3 | 7 | 14 | 4 | 12 | 5 | |
| 5 | | | | | 0 | 4 | 11 | 1 | 9 | 2 | |
| 6 | | | | | | 0 | 7 | 13 | 5 | 14 | |
| 7 | | | | | | | 0 | 6 | 14 | 7 | |
| 8 | | | | | | | | 0 | 8 | 1 | |
| 9 | | | | | | | | | 0 | 9 | |
| 10 | | | | | | | | | | 0 | |
| . | | | | | | | | | | | |
| . | | | | | | | | | | | |
| . | | | | | | | | | | | |
| M | | | | | | | | | | | |

let $X_{ij}$ be the matrix entry of the i-th row and j-th column, and adopt the convention that frequency $j$ is X ports to the right of frequency i.

With this convention, the matrix is filled by the rule $$X_{ij} = X_{i,j-1} + X_{j-1,j} \text{ Modulo N addition} \quad (16)$$

$i \leq j$ N = number of ports

Step 2:

For an ideal port-frequency assignment plan, the port difference matrix must pass the following four tests. In these tests, the entries of the all zero ii-th (prime) diagonal are excluded.

*a*. That no number is repeated in a diagonal descending from left to right.

*b*. That no number is repeated in a column or row.

Consider the following port and frequency difference matrix

| Frequency | 1 | 2 | 3 | 4 | 5 | 5 | 7 | 8 | 9 | 10———M | |
|---|---|---|---|---|---|---|---|---|---|---|---|
| | | | | | Frequency | | | | | | |
| 1 | 0,0 | 1,2 | 2,3 | 3,8 | 4,11 | 5,15 | 6,6 | 7,12 | 8,4 | 9,13 | |
| 2 | | 0,0 | 1,1 | 2,6 | 3,9 | 4,13 | 5,4 | 6,10 | 7,2 | 8,11 | M<16 |
| 3 | | | 0,0 | 1,5 | 2,8 | 3,12 | 4,3 | 5,9 | 6,1 | 7,10 | |
| 4 | | | | 0,0 | 1,3 | 2,7 | 3,14 | 4,4 | 5,12 | 6,5 | |
| 5 | | | | | 0,0 | 1,4 | 2,11 | 3,1 | 4,9 | 5,2 | |
| 6 | | | | | | 0,0 | 1,7 | 2,13 | 3,5 | 4,14 | |
| 7 | | | | | | | 0,0 | 1,6 | 2,14 | 3,7 | |
| 8 | | | | | | | | 0,0 | 1,8 | 2,1 | |
| 9 | | | | | | | | | 0,0 | 1,9 | |
| 10 | | | | | | | | | | 0,0 | |
| . | | | | | | | | | | | |
| . | | | | | | | | | | | |
| . | | | | | | | | | | | |
| M | | | | | | | | | | | |

where the second element of each pair of entries forms the port difference matrix as described above and the first element of each pair represents frequency differences between all frequencies. Thus each entry represents the vector difference, in port-frequency space, between two frequencies. That is, if each frequency-port assignment is a two dimensional vector in port-frequency space, the entries in the above matrix are the differences between all pairs of vectors.

Consider vectors $\overline{A}$, $\overline{B}$, $\overline{C}$, $\overline{D}$ in port-frequency space. Note that the port and frequency of a third-order intermodulation product, $\overline{IM}$, is the vector sum of $$\overline{IM} = \overline{A} + \overline{B} - \overline{C}$$
$$(\text{or } \overline{IM} = 2\overline{A} - \overline{B}) \quad (17)$$

These equations can be rewritten as $$\overline{A} - \overline{C} = \overline{IM} - \overline{B}$$
$$(\text{or } \overline{A} - \overline{B} = \overline{IM} - \overline{A}) \quad (18)$$

Note that if $$\overline{A} - \overline{C} = \overline{D} - \overline{B}$$
$$(\text{or } \overline{A} - \overline{B} = \overline{D} - \overline{A}) \quad (19)$$

then $$\overline{D} = \overline{IM}.$$

That is, the intermodulation products formed by the A+B−C (or 2A−B) combination of carriers A, B and C will fall at both the frequency and port of carrier D if equation (19) is true.

Note, however, that both sides of equation (19) are entries in the port and frequency difference matrix. Thus if any two entries in this matrix are the same, the frequency-port assignment plan is not valid. Since all entries not in the same diagonal are different due to the frequency differences, it is sufficient just to use the port difference matrix and test for repeated entries along any one diagonal. This, then, is the rationale for test (a) stated above.

The reason for test (*b*) is that if a number in any one row or column of the port difference matrix is repeated, then two frequencies must be assigned to the same port.

Note that if frequency one is assigned to port one, the members of the first row plus one ($X_1$ +1) of the port difference matrix form the frequency-port assignment plan.

Example; Computation of the 12 Channel 16 × 16 Butler Matrix Transponder Port-Frequency Assignment Plan The table below gives the frequency-port assignments for a 16 × 16 Butler matrix transponder for twelve channel operation over a set of twelve contiguous frequency bands. This plan is ideal in the sense that at all of the third-order "spatially filtered" intermodulation products that appear at an output port, are at frequencies different than the frequency assigned to that port and thus are filtered by the port's output filter.

Table 1.

12 Channel Frequency-Port Plan for a 16 × 16 Butler Matrix Transponder

| Frequency | 1 | 2 | 3 | 4 | 5 | 6 | 7 | 8 | 9 | 10 | 11 | 12 |
|---|---|---|---|---|---|---|---|---|---|---|---|---|
| Port Number | 1 | 9 | 11 | 16 | 12 | 6 | 5 | 8 | 3 | 7 | 14 | 4 |

The computer program used to calculate this plan is described as follows. First, a random sequence of 11 numbers is selected such that the numbers range from 1 to 15 and no number is repeated. An 11 × 11 port difference matrix is used since frequency 1 is assigned to port 1, and the all zero prime diagonal is not required in computations. The random sequence is used as the $X_{i+1,j}$ diagonal of the port difference matrix, which is filled and tested via the algorithm described above.

If the matrix fails a test, a new random sequence is generated and the procedure is repeated, except when the test failure occurs because of the 11-th (last) member of the test sequence. When this condition occurs, thhe "almost perfect" sequence is tested with each of the four allowable remaining numbers as the 11-th member of the test sequence. If this procedure is unsuccessful, a new random sequence is selected, and the search continues until a valid assignment is found.

The table below is the computed port difference matrix for a valid 12 channel frequency port assignment plan. Column 1 and Row 12 have been omitted, as they contain zeros. This was the only valid plan found after trying approximately 151,000 random sequences (which took 13.5 minutes of computer time).

Table 2.

Computed Valid 12 Channel Port Difference Matrix for a 16 × 16 Butler Matrix Transponder

| | Frequency | | | | | | | | | | |
|---|---|---|---|---|---|---|---|---|---|---|---|
| Frequency | 2 | 3 | 4 | 5 | 6 | 7 | 8 | 9 | 10 | 11 | 12 |
| 1 | 8 | 10 | 15 | 11 | 5 | 4 | 7 | 2 | 6 | 13 | 3 |
| 2 | 0 | 2 | 7 | 3 | 13 | 12 | 15 | 10 | 14 | 5 | 11 |
| 3 | | 0 | 5 | 1 | 11 | 10 | 13 | 8 | 12 | 3 | 9 |
| 4 | | | 0 | 12 | 6 | 5 | 8 | 3 | 7 | 14 | 4 |
| 5 | | | | 0 | 10 | 9 | 12 | 7 | 11 | 2 | 8 |
| 6 | | | | | 0 | 15 | 2 | 13 | 1 | 8 | 14 |
| 7 | | | | | | 0 | 3 | 14 | 2 | 9 | 15 |
| 8 | | | | | | | 0 | 11 | 15 | 6 | 12 |
| 9 | | | | | | | | 0 | 4 | 11 | 1 |
| 10 | | | | | | | | | 0 | 7 | 13 |
| 11 | | | | | | | | | | 0 | 6 |

A specific example of a 4 × 4 Butler matrix transponder illustrating the application of the principles according to the teaching of this invention is shown in FIG. 3. Filters have been omitted from FIG. 3 to simplify the illustration. The input Butler matrix 31 has four input ports numbered according to channel assignment as follows: 2,4,1, and 3, The matrix 31 comprises four 90° hybrids 301, 302, 303, and 304. Input ports 2 and 4 are connected to hybrid 301, while input ports 1 and 3 are connected to hybrid 303. One output port of hybrid 301 is connected directly to the corresponding input port of hybrid 302, and the other output port of hybrid 301 is connected through a 45° phase shifter 305 to an input port of hybrid 304. Similar connections are made between the output ports of hybrid 303 and the input ports of hybrids 302 and 304 with phase shifter 306 being connected between hybrids 303 and 302. The Butler matrix just described is analogous to the matrix shown in FIG. 5 of the above-referenced Butler patent.

The output ports of matrix 31 are connected to respective series-connected adjustable phase shifters 32, and traveling wave tube amplifiers 33. The adjustable phase shifters 32 which precede each of traveling wave tube amplifiers 33 are used to compensate for slight tube-to-tube phase differences. The outputs of amplifiers 33 are connected to the corresponding input ports of the output Butler matrix 35. Matrix 35 is identical to matrix 31, but connected in mirror-image fashion. Thus, matrix 35 comprises 90° hybrids 307, 308, 309, and 311 and 135° phase shifters 312 and 313. Phase shifters 312 and 313 are the supplements of phase shifters 305 and 306 because of the 180° phase shifts of amplifiers 33.

The input and output numbers given in FIG. 3 correspond to contiguous assignments in the "port domain." For example, a carrier input at port 2 is amplified and appears at output port 2', and the third order intermodulation products produced by a carrier from port 2 and a carrier from port 3 will appear only at output ports 4' and 1'. The port-frequency assignment used in this specific example is 1, 2, 4, 3.

The advantages that a Butler matrix transponder offers over a conventional arrangement of a separate amplifier for each channel are many. First, for a given carrier to intermodulation product noise ratio and a given primary DC power level, the output RF power is increased. Hence, the Butler matrix transponder offers a means of boosting output power and DC-to-RF efficiency without increasing individual amplifier ratings. The corollary of these improvements is also true, i.e. for a given output power and carrier to intermodulation product ratio, the DC power requirement is reduced and the DC-to-RF efficiency is improved by the use of a Butler matrix transponder.

Another advantage is that if the number of channels is less than the number of Butler matrix transponder ports the output power per channel is correspondingly greater than the amplifying devices. For example, a 12 channel 16 × 16 Butler matrix transponder would have a per channel output power of four-thirds the individual amplifier power. Hence, the Butler matrix transponder provides a means of efficiently paralleling power limited amplifiers.

A further advantage is that the Butler matrix transponder has a flexible power-sharing capability which permits some channels to operate with a greater output power than others, without carrier-to-intermodulation product ratio degradation to any channel.

There are disadvantages of the Butler matrix transponder. First, the bandwidth of the amplifiers in an M channel Butler matrix transponder must be M times as wide as a single channel transponder. Second, under fully loaded conditions, the power in each channel must be equal if it is assumed that all channels are subject to the same minimum carrier-to-intermodulation product specification. A third disadvantage is that a Butler matrix transponder, when compared to other linearization techniques, has the obvious disadvantage of requiring multichannel operation. But these disadvantages are more than offset by the significant advantages realized by using a Butler matrix transponder.

It will be apparent that the embodiments shown are only exemplary and that various modifications can be made in construction and arrangement within the scope of the appended claims.

I claim:

1. A multichannel communications transponder, comprising;

a. first phasing network means for receiving M distinct channel signals and providing N output signals where M ≤ N, each of said N output signals consisting of a sum of all M distinct phase shifted signals divided by $\sqrt{N}$;

b. N nonlinear amplifier means connected to receive and amplify said N output signals from said first phasing network means; and c. second phasing network means identical to said first phasing network means and connected in mirror image fashion to receive the amplified N output signals and providing M distinct channel output signals corresponding to the originally received M distinct channel signals. j

2. A multichannel communications transponder as recited in claim 1 further comprising: a first set of M bandpass filters tuned to said M distinct channel signals and connected to the outputs of said second phasing network means wherein intermodulation product signals produced by said N nonlinear directed to filters tuned to frequencies different from the intermodulation product frequencies by said second phasing network means.

3. A multichannel communications transponder as recited in claim 2 further comprising; a second set of M bandpass filters tuned to the same bands as said first set and connected to the input of said first phasing network means to separate incoming signals into M distinct channels.

4. A multichannel communications transponder as recited in claim 1 wherein said first and second phasing network means are first and second Butler matrices each having N input ports and N output ports.

5. A multichannel communications transponder as recited in claim 4 wherein m<N and the unused input ports of said first Butler matrix and the unused output ports of said second Butler matrix are terminated in matching impedances.

6. A multichannel communications transponder as recited in claim 5 wherein $M = 12$ and $N = 16$.

7. A multichannel communications transponder as recited in claim 4 wherein $M = N = 4$.

8. A multichannel communications transponder as recited in claim 4 further comprising: a set of M bandpass filters tuned to said M distinct channel signals and connected to M of the output ports of said second Butler matrix, said M output ports of said second Butler matrix corresponding to the M input ports of said first Butler matrix to which the received M distinct channel signals are coupled, wherein said intermodulation product signals are directed to output ports of said second Butler matrix to which are connected filters tuned to frequencies different from the intermodulation product frequencies by said second Butler matrix.

9. A multichannel communications transponder as recited in claim 6 further comprising input means receiving twelve signals occupying contiguous frequency bands and numbered consecutively from 1 to 12 and applying those input signals to the input ports, numbered consecutively from 1 to 16, of said first Butler matrix according to the following frequency band-port assignment plan;

| | | | | | | | | | | | | |
|---|---|---|---|---|---|---|---|---|---|---|---|---|
| Frequency Band | 1 | 2 | 3 | 4 | 5 | 6 | 7 | 8 | 9 | 10 | 11 | 12 |
| Port Number | 1 | 9 | 11 | 16 | 12 | 6 | 5 | 8 | 3 | 7 | 14 | 4 |

10. A multichannel communications transponder as recited in claim 7 further comprising input means receiving twelve signals occupying contiguous frequency bands and numbered consecutively from 1 to 4 and applying those input signals to the input ports, numbered consecutively from 1 to 4, of said first Butler matrix according to the following frequency band-port assignment plan;

| | | | | |
|---|---|---|---|---|
| Frequency Band | 1 | 2 | 3 | 4 |
| Port Number | 3 | 1 | 4 | 2 |

* * * * *

UNITED STATES PATENT AND TRADEMARK OFFICE

CERTIFICATE OF CORRECTION

PATENT NO. : 3,917,998

DATED : November 4, 1975

INVENTOR(S) : George Robert WELTI

It is certified that error appears in the above-identified patent and that said Letters Patent are hereby corrected as shown below:

IN THE SPECIFICATION:

Column 4, line 28, delete "$A(k_1k_2, \ldots k_Q)$" and insert -- $A(k_1, k_2, \ldots k_Q)$ -- line 39, delete "f1" and insert -- $f_1'$ -- line 43, delete "f1" and insert -- $f_1$ -- line 48, delete "$e^{j\omega} ml^t$" and insert -- $e^{j\omega} ml^t$ --

Column 5, line 7, delete "m = 0" and insert -- m = 1 -- line 22, delete entire line of Eq. 9 and insert $$-- e^{j}\left(k_{1,0}\,\phi_{1,0} + k_{1,1}\,\phi_{1,1} + \ldots k_{M_{N-1},\,N-1}\,\phi_{M_{N-1},\,N-1}\right)] \quad (9)$$

line 29, delete Eq. 11 line 32, after "constraint" insert --

$$\sum_{l=0}^{N-1} \sum_{m=1}^{M_l} k_{m,l} = 1 \quad (11)$$

line 43, delete "$(2\pi l/N$" and insert -- $2\pi l/N$ line 52, In Eq. 12, delete "$\frac{2\pi l \gamma}{N}$" and insert -- $\frac{2\pi lr}{N}$ --

UNITED STATES PATENT AND TRADEMARK OFFICE

CERTIFICATE OF CORRECTION

PATENT NO. : 3,917,998
DATED : November 4, 1975
INVENTOR(S) : George Robert WELTI It is certified that error appears in the above-identified patent and that said Letters Patent are hereby corrected as shown below:

IN THE SPECIFICATION:

| | | |
|---|---|---|
| Column 5, | line 57, | in Eq. 12, delete "$j\omega_{m,}$ 1t)" and insert -- $j(\omega_{m,1}t)$ -- |
| | line 59, | In Eq. 12, delete "$j(\omega_{m,}$1t)" and insert -- $j(\omega_{m,1}t)$ -- |
| Column 7, | line 8, | delete "Mu" and insert -- M -- |
| Column 8, | line 1, | delete "let" and insert -- Let -- |
| | line 51, | delete "$\bar{D}$ = $\overline{IM}$" and insert -- $\bar{D} = I\bar{M}$ -- |
| Column 9, | line 2, | delete "$(X_1+1)$" and insert -- $(X_{1j} +1)$ -- |
| | line 5, | after "Example" delete semi-colon and insert a colon |
| | lines 5, 6 and 7, | Underscoring omitted |

UNITED STATES PATENT AND TRADEMARK OFFICE

CERTIFICATE OF CORRECTION

PATENT NO. : 3,917,998

DATED : November 4, 1975

INVENTOR(S) : George Robert WELTI

It is certified that error appears in the above-identified patent and that said Letters Patent are hereby corrected as shown below:

<u>IN THE CLAIMS:</u>

| | | |
|---|---|---|
| Column 11, | line 15, | after "comprising" delete semi-colon and insert colon |
| | line 30, | delete "j" after period |
| | line 36, | after"nonlinear" insert -- amplifier means are -- |
| | line 41, | after "comprising" delete semi-colon and insert colon |
| Column 12, | line 2, | delete "$m \leq N$" and insert -- $M \leq N$ -- |
| | line 29, | after "plan" delete semi-colon and insert colon |
| | lines 32 and 33, | Horizontal and vertical lines omitted |
| | line 43, | after "plan" delete semi-colon and insert colon |
| | line 46, | Horizontal and vertical lines omitted |

Signed and Sealed this

*ninth* Day of *March 1976*

[SEAL]

*Attest:*

RUTH C. MASON
*Attesting Officer*

C. MARSHALL DANN
*Commissioner of Patents and Trademarks*